Jan. 29, 1963 L. KLEINMAN ET AL 3,076,132

HARMONIC GENERATOR

Filed June 27, 1958 2 Sheets-Sheet 1

Aristid D. Berk,
Leonard Kleinman,
*INVENTORS.*

*BY.*

R. A. Boguski

*ATTORNEY*

Jan. 29, 1963 L. KLEINMAN ET AL 3,076,132

HARMONIC GENERATOR

Filed June 27, 1958 2 Sheets-Sheet 2

Aristid D. Berk,
Leonard Kleinman,
*INVENTORS.*

*BY.*

R. A. Bogucki

*ATTORNEY.*

United States Patent Office 3,076,132

Patented Jan. 29, 1963

3,076,132
HARMONIC GENERATOR

Leonard Kleinman, Berkeley, and Aristid D. Berk, Los Angeles, Calif., assignors to Hughes Aircraft Company, Culver City, Calif., a corporation of Delaware Filed June 27, 1958, Ser. No. 745,089
1 Claim. (Cl. 321—69)

This invention relates to devices for generating harmonic frequencies and particularly to microwave harmonic generators utilizing ferromagnetic elements within resonant cavities.

Harmonic generating devices are useful in many applications in systems work. The need for such devices exists in the microwave region in the same fashion as in the lower frequency communications, locating and signalling systems in which are currently employed. Often, apart from the need for generating higher frequencies, it is preferable to employ a harmonic generator in place of an independent oscillation generator. Many such generators, such as vacuum devices, are subject to instability or deterioration with age, or require extra equipment to remain precisely tuned.

The successful generation of oscillatory signals in the microwave region becomes increasingly complicated as the frequency to be generated increases. The various means heretofore used for generating these frequencies, such as tubes and other oscillation generators, tend to become unstable or inaccurate in the higher reaches of the kilomegacycle region. When it is nevertheless desired to develop frequencies of this order, the most practicable means is often the use of some harmonic frequency generating arrangement. One such generator, a frequency doubling arrangement utilizing ferromagnetic elements within a resonant cavity, is described by Ayres, Vartanian, and Melchor in an article entitled "Frequency Doubling in Ferrites" in the Journal of Applied Physics for February 1956, pp. 188–189. With the device described therein, microwave energy at a given frequency is provided to an input of a resonant cavity. At the given frequency, the cavity resonates in the $TE_{101}$ mode. The cavity contains a ferromagnetic element which is magnetized with a direct current (hereafter D.C.) magnetic field extending in a direction normal to the direction of radio frequency (hereafter RF) magnetization within the cavity. As stated therein, there is a tensor relationship between the static magnetization of the ferrite and the RF magnetization within the cavity which provides an RF component of magnetization of the second order along the direction of static magnetization. This second order component is at twice the frequency of the applied RF field and is utilized as the output from the cavity. While the device described in the cited article operates satisfactorily the output provided is derived with quite low efficiency and in some cases would not be suitable for driving further amplifying equipment.

Accordingly, it is an object of the present invention to provide an improved harmonic frequency generator for the microwave region.

Another object of this invention is to provide a microwave frequency harmonic generator which is extremely stable and relatively immune from wear.

Yet another object of this invention is to provide a stable device for accurately and usefully providing harmonic frequency generation in the kilomegacycle region and above.

It is a further object of this invention to provide an improved frequency doubling device operating in the microwave region and using a ferromagnetic loaded cavity to provide higher output powers than have heretofore been possible.

A further object of this invention is to provide a microwave harmonic frequency generator which operates with greater efficiency than has heretofore been known.

These and other objects of this invention are achieved in accordance with this invention by the use of a resonant cavity capable of supporting a principal mode of RF magnetization and an additional higher mode at a frequency multiple of the principal mode. The specific example given is a frequency doubler, so that the additional higher resonance is double the principal frequency. With a cavity thus arranged a ferromagnetic element is placed against one wall of the cavity and magnetized by a static magnetic field extending normal to the RF magnetic field esablished by the principal mode of resonance. The interaction between the principal RF mode and the magnetized ferromagnetic element results in an oscillatory component of double frequency. The additional resonance at double frequency provided by the cavity is arranged to present an appreciably greater impedance to this double frequency oscillation. Consequently, the double frequency component may be extracted at a relatively high power level. Because such a device provides essentially static conditions of operation and depends basically upon solid state effects, the output is essentially exact and relatively immune to deterioration in quality.

The novel features of this invention, as well as the invention itself, both as to its organization and method of operation, may best be understood when considered in the light of the following description, when taken in connection with the accompanying drawing, in which like reference numerals refer to like parts, and in which.

A general survey of the use and properties of ferromagnetic devices is provided in an article by Fox, Miller, and Weiss entitled "Behavior and Applications of Ferrites in the Microwave Region," at pp. 4–105 of the Bell System Technical Journal for January 1955. Although the article refers throughout to "ferrites," other materials, principally the garnet-type materials, exhibit the same properties. Accordingly it would be more appropriate to use the general designation of "ferromagnetic" to describe these materials. Where the term "ferrite" is used herein it is employed, in conformity with general current practice, as a shorthand notation for ferromagnetic materials in general.

The general manner in which harmonic frequency effects are provided by a magnetically biased ferromagnetic element is described in the above-identified article by Ayres et al. When a static magnetic field passing through a ferromagnetic element is supplemented by an RF magnetic field which is normal to the static magnetic field, there is known to be an RF magnetization parallel to the static magnetic field. This RF component of magnetization has previously been neglected because it is a second order effect which has hitherto been too small to be usefully employed. As described in the article by Ayres et al. this RF component of magnetization includes oscillatory terms which are multiples of the frequency of the applied RF field. The device provided by Ayres et al. used a cavity resonant in the $TE_{101}$ mode and extracts the frequency doubled component by the use of a coupling loop encompassing the portion of a ferrite disk within the cavity and feeding a coaxial output. The present device, as described below, operates in a different fashion to provide further and distinct advantages in harmonic generation.

The present device is provided as an example of harmonic frequency generating devices which may be constructed in accordance with the invention. Although the present device is described as a frequency doubler, it will be apparent to those skilled in the art that the principles involved may be used in generating any harmonic which is desired and which is provided as a term in the magnetic torque equation of a magnetized ferromagnetic sample.

Figure 1:
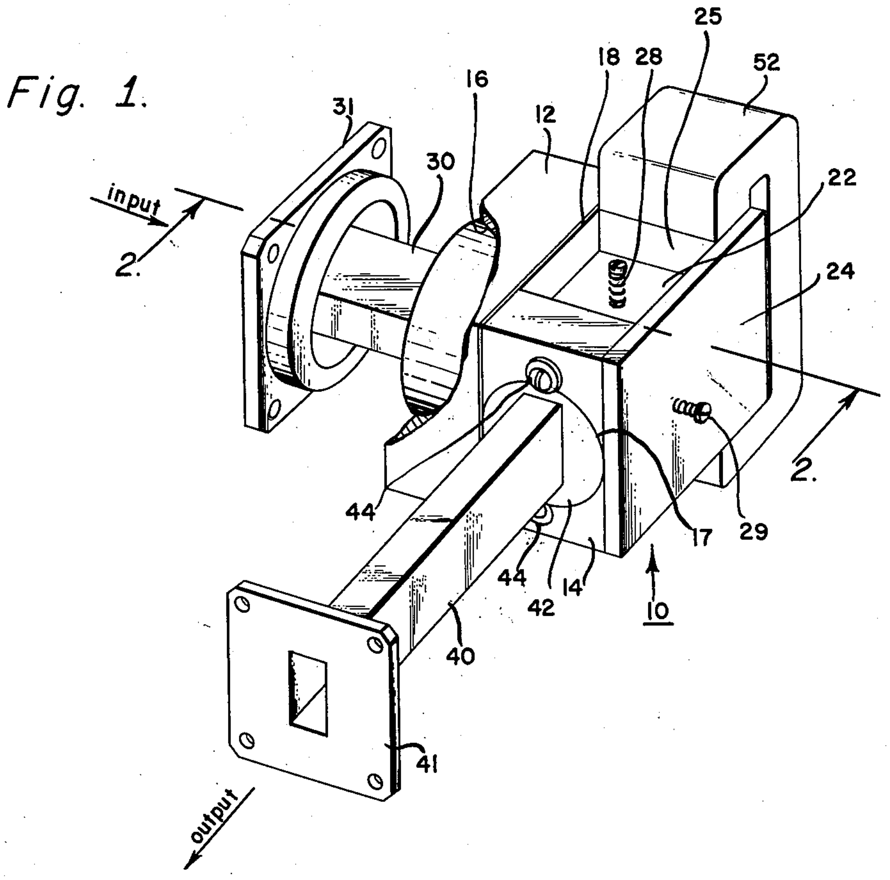
FIG. 1 is a perspective view, partly broken away, of an arrangement employing a resonant cavity in accordance with this invention.
Figure 2:
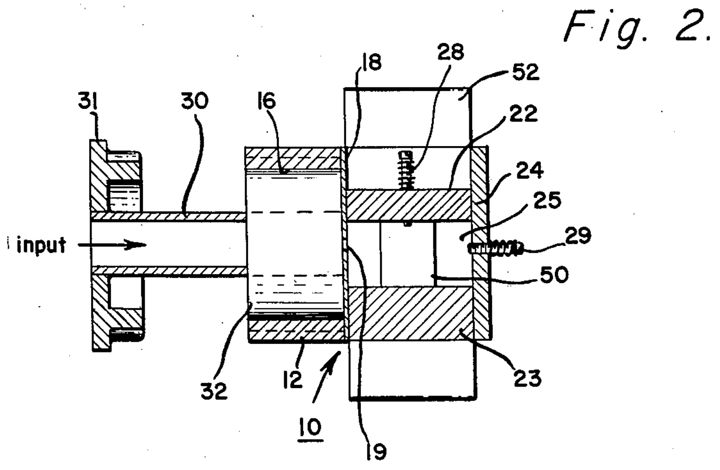
FIG. 2 is a side sectional view taken along the line 2—2 of FIG. 1, showing details of the arrangement of FIG. 1.
Figure 3:
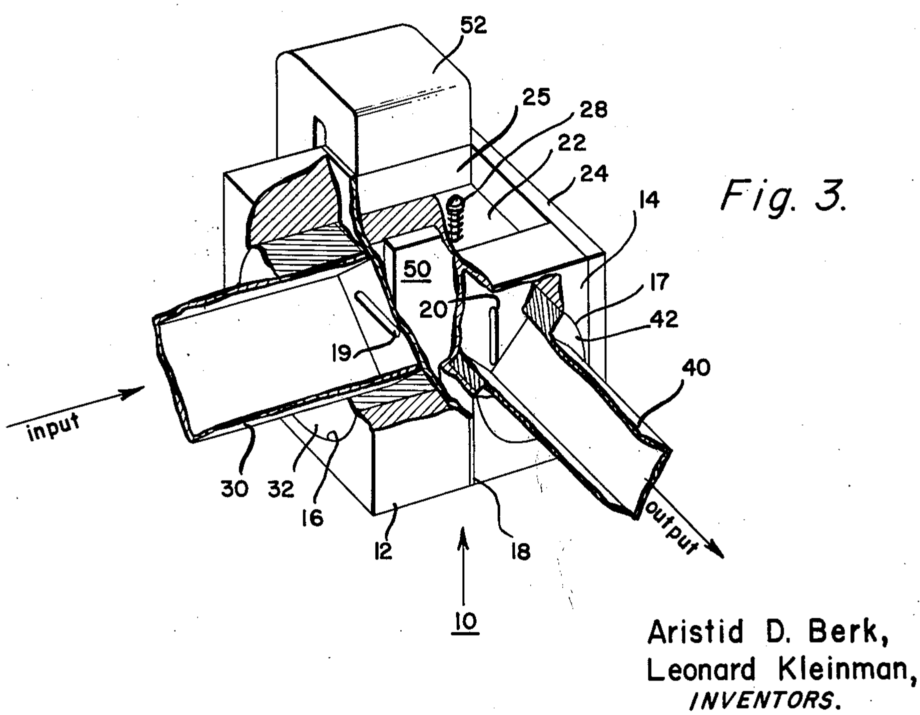
FIG. 3 is a fragmentary view of the arrangement of FIG. 1, partly broken away, showing other features thereof in greater detail, and showing alternative positions for some of the elements employed.

Referring now to FIGS. 1, 2 and 3, which illustrate an arrangement of a frequency doubling harmonic generator in accordance with this invention, there is provided a resonant cavity 10. The resonant cavity 10 is of rectangular shape and is constructed to provide a number of useful operative features. Thus the resonant cavity 10 includes an input wall 12 and an output wall 14 which have a material thickness in the direction normal to the width and height of the wall 12 or 14. For convenience herein, the terms height, top and bottom will be taken with reference to the positions shown in the figures. It will of course be understood that the device can be operated in substantially any position desired.

The input and output walls 12 and 14 each include a different centrally positioned cylindrical recess 16 and 17 respectively. The recess 16 in the input wall 12 defines a cylindrical bore which extends through the wall 12. The cylindrical recess 17 in the output wall 14 does not extend through the wall 14 but merely extends to a selected depth, leaving an interior wall portion (best seen in FIG. 3). The portion of the input wall 12 which is interior to the cavity 10 may be a separate conductive plate 18 having a centrally positioned input coupling aperture consisting of a slotted iris 19. The input iris 19 has its direction of elongation normal to the height dimension of the input wall 12. The output wall 14 also includes a centrally positioned coupling aperture in the form of a slotted iris 20. The output iris 20 has its direction of elongation substantially parallel to the height dimension of the resonant cavity 10.

The remainder of the rectangular resonant cavity 10 is defined by a top wall 22 and a bottom wall 23 (see FIG. 2 particularly) affixed to a side wall 24 and a back wall 25. The various walls and members, including the conductive plate 18 and the remainder of the input wall 12, may be affixed to each other by solder or mechanical means (not shown) well known in the art, these means having been omitted for greater clarity. The terms side and back are here used for descriptive purposes only—the side wall 24 being that wall opposite the input wall 12 and the back wall 25 being the wall opposite the output wall 14.

The top wall 22 of the resonant cavity 10 is recessed with respect to the top portions of the input wall 12 and the back wall 25. The recessed portion somewhat reduces the weight needed for the resonant cavity 10 and establishes the needed internal dimensions while permitting employment of some of the other features described below.

A first spring loaded tuning screw 28 is mounted in the top wall 22 of the resonant cavity 10 and extends into the central aperture of the cavity 10 through an appropriate thread in the top wall 22. The first tuning screw 28 may be adjusted to tune the mode of higher resonance in the cavity 10 without affecting the principal mode. A second tuning screw 29 is likewise selectively movable into the interior of the resonant cavity 10 through an appropriate threaded aperture in the side wall 24. The second tuning screw 29 may be employed to adjust the tuning of the principal resonant mode in the cavity 10.

An input waveguide 30 has an input flange 31 at one end and a cylindrical hub 32 at the other, the cylindrical hub 32 fitting into and registering with the cylindrical recess 16 in the input wall 12 of the resonant cavity 10. Thus the input waveguide 30 may be rotated around its longitudinal axis with respect to the resonant cavity 10. When the broad walls of the input waveguide 30 are normal to the height dimension (as seen in these figures), the broad walls of the input waveguide 30 are substantially parallel to the direction of elongation of the input iris 19 in the input wall 12.

An output waveguide 40 is coupled to the output wall 14 in a fashion similar to the coupling of the input waveguide 30 to the associated input wall 12. That is, the output waveguide 40 includes an output flange 41 on one end and a cylindrical hub 42 on the other. The cylindrical hub 42 fits within and registers with the associated cylindrical recess 17 in the output wall 14. As a result, the output waveguide 40 may be rotated about its longitudinal axis with respect to the resonant cavity 10, and specifically with respect to the output iris 20.

A pair of set screws 44 set into the output wall 14 may be employed to restrict the angular movement of the output waveguide 40. Frictional restraint may also be employed, as with the input waveguide 30.

A ferromagnetic ceramic element 50 is positioned within the resonant cavity 10 against the back wall 25. A static magnetic field is provided through the ferromagnetic element or ferrite 50 by a permanent magnet 52. The direction of the static magnetic field is parallel to the direction of height (as viewed in the figures) of the resonant cavity 10.

Figure 4:
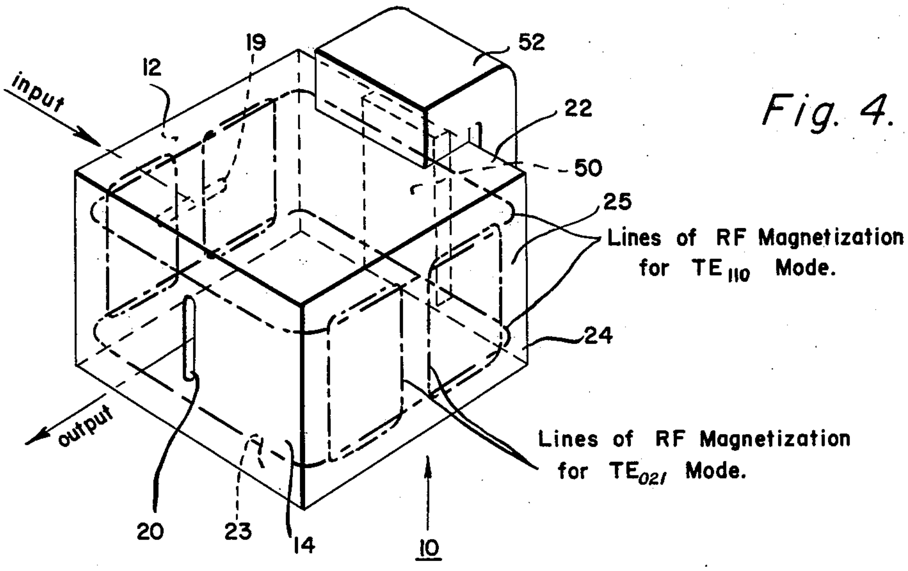
FIG. 4 is a simplified schematic representation of the operation of the resonant cavity of FIG. 1, showing the lines of RF magnetic field existing therein.

In operation, an harmonic generator in accordance with the present invention may be constructed as a frequency doubler which operates to establish dual resonances within the resonant cavity 10. Input energy of a given frequency is fed through the input waveguide 30 into the resonant cavity 10 via the input iris 19. Referring specifically to FIG. 4, input energy at the given frequency is directed along the input waveguide 30 in the $TE_{10}$ mode. Such energy, when coupled through the input iris 19, results in the generation of a $TE_{110}$ mode within the resonant cavity 10, the cavity 10 being dimensioned to support this mode at the given frequency.

The lines of RF magnetization for the $TE_{110}$ mode are shown in FIG. 4, and lie in planes which are parallel to the horizontal frame of reference for the cavity 10. The ferrite element 50 is magnetized by the associated permanent magnet 52. Note that the lines of RF magnetization thus established are normal to the direction of the D.C. magnetic field established by the permanent magnet 52. Accordingly, the conditions needed to provide a component of RF magnetization at a double frequency and parallel to the direction of the D.C. magnetic field in the ferrite 50 have been established.

Concurrently, the resonant cavity 10 is tuned, by arrangement of the cavity 10 dimensions, to a double frequency mode, the $TE_{021}$ mode. As seen in FIG. 4, the lines of RF magnetization in the $TE_{021}$ mode include portions extending in the height direction of the resonant cavity 10. As a result, the double frequency $TE_{021}$ mode to which the cavity 10 is also tuned interacts with the double frequency component established by the ferrite element 50.

The ferrite element 50 may be considered to act at double frequency, within certain power ranges, as a constant RF magnetic current generator. The power limitation imposed is inherent in the ferrite, and is that which is due to the impedance of the ferrite itself. As higher power operation is reached the impedance of the ferrite introduces an additional factor which ultimately prevents its operation as a constant current generator. A different type of limitation and less significant is imposed at high powers by the tendency of the ferrite sample to heat, thus perhaps exceeding its Curie temperature and destroying its useful magnetic properties. Viewing the ferrite element 50 as a constant RF magnetic current generator, it will be appreciated that the greater the impedance presented to such a generator the larger the power extracted from it. The greater the power extracted from the ferrite element 50, the more effective the conversion from single to double frequency. Thus a cavity 10 having an additional resonance at double frequency and having the proper relationship to the double frequency component in the ferrite 50 in the manner indicated herein performs the function of presenting the high impedance which makes greater efficiency possible.

The output iris 20 is positioned in the output wall 14 so as to couple only to the double frequency $TE_{021}$ mode, in well known fashion. Consequently energy of the double frequency is fed to the output waveguide 40 in the $TE_{10}$ mode and provided as output from the device.

Some of the advantages of this harmonic frequency generating arrangement will now be apparent. The cavity may be arranged to be resonant in two desired modes at whatever given input frequency is selected in the microwave region. Therefore frequency from a given source may be effectively multiplied to a very high microwave frequency. Furthermore, because this multiplication is dependent primarily on the solid state effects within the ferromagnetic element, there is a constant and substantially exactly multiplied output. In addition the elements are not subject to deterioration in properties with age. The relationships may be used to provide useful output not only with the double frequency component in the ferrite, but with other harmonics as well.

A number of additional considerations should be evident to those skilled in the art. The presence of the fine tuning screws 28, 29 in this arrangement makes possible the precise tuning of the resonant cavity 10. The first tuning screw 28 in the top wall 22 enables tuning in the $TE_{021}$ mode without affecting the $TE_{110}$ mode. The second tuning screw 29 adjusts the resonance of the cavity in the $TE_{021}$ mode without affecting the $TE_{110}$ mode, in similar fashion. The energy coupled through the input iris 18 and the output iris 20 may have to be adjusted somewhat for better cooperation with other elements (not shown). Accordingly, the input and output waveguides 30 and 40 respectively are arranged to be rotatable about their longitudinal axes. This relative rotation is accomplished by use of the relatively thick input and output walls, 12 and 14 respectively, having cylindrical recesses 16, 17 respectively within which the hubs 32, 44 respectively register. Desired amounts of coupling of energy through the device is accordingly provided, if needed, by rotating the input waveguide 30 and the output waveguide 40 to desired positions, as shown specifically in FIG. 3.

The dimensions of the ferromagnetic element 50 are not critical but certain arrangements may be preferable. In the height dimensions (relative to the cavity 10) the ferrite 50 may be substantially the same as the cavity 10, thus providing better usage of the static magnetic field. In the direction normal to the plane of the back wall 25 against which the ferrite 50 is placed, it is desirable to employ a small dimension, thus decreasing dimensional resonances and standing wave effects due to the insertion of the ferrite 50 into the cavity 10. The remaining dimension, that parallel to the plane of the back wall 25, may be considerably larger but should be smaller than the dimension of the cavity 10 in that direction.

The construction shown in FIGS. 1, 2 and 3 is not, of course, to scale. Nor need the walls of the cavity 10 be arranged as shown, although this arrangement is particularly advantageous in a number of respects. Not only may there be adjustments for better resonances and for better energy coupling, but in addition there is good heat conduction and a rugged structure. The walls may be fabricated with a principal member and a conductive plate, as is the input wall shown, or as a single member, as is the output wall.

A frequency doubling arrangement constructed in accordance with this invention successfully converts energy at 9,000 megacycles into a double frequency output at 18,000 megacycles. For this frequency the cavity had an interim height of 0.507", a front to back dimension of 0.862", and a side to side dimension of 0.957". The ferrite was 0.472" x 0.015" x 0.150", in height, depth and width, respectively. The effective output is several orders of magnitude higher than has previously been feasible with single cavity techniques. The magnetic field employed had an intensity of approximately 500 oersteds. Those skilled in the art, however, will appreciate that other relationships of field intensity and frequency may be employed.

Thus there has been described an improved harmonic frequency for the microwave region. The device provides an harmonic output with relatively high efficiency and with exactness and substantial immunity to deterioration with use.

We claim:

A microwave frequency doubler for doubling a given frequency comprising: a rectangular resonant cavity device diminished to support a $TE_{110}$ mode at the given frequency and also to support a $TE_{021}$ mode at double the given frequency, said cavity being defined by an input wall, an output wall and first and second walls normal to the planes of the lines of RF magnetization of energy in the $TE_{110}$ mode, and top and bottom walls substantially parallel to the planes of the lines of RF magnetization in the $TE_{110}$ mode, said input and output wall having a material thickness and each including a cylindrical recessed portion in the exterior thereof and a slotted iris aperture centrally disposed therein, each slotted iris coupling energy between the interior and exterior of said cavity, the input iris being elongated in a direction parallel to the planes of the lines of RF magnetization in the $TE_{110}$ mode in said cavity, thereby coupling to the $TE_{110}$ mode, the output iris being elongated in a direction normal the lines of RF magnetization in the $TE_{110}$ mode, thereby coupling to the $TE_{021}$ mode only in said cavity; input waveguide means including a cylindrical hub registering in the recessed portion of the input wall and rotatable therein about its longitudinal axis, said input waveguide means providing input energy at the given frequency to said resonant cavity; output waveguide means including a cylindrical hub registering with the recessed portion of the output wall of said resonant cavity, said input and output waveguide means being rotatable therein about its longitudinal axis; a ferrite slab positioned within said resonant cavity against the wall opposite said output wall, said ferromagnetic slab being relatively thin in the direction penetrating into said cavity, substantially the height of the associated wall and less than the transverse dimension of the wall; a permanent magnet having oppositely disposed pole faces, each of said pole faces registering with a different outer surface of said resonant cavity at a point adjacent a height extremity of said ferromagnetic slab, such that a static magnetic field is provided through said ferromagnetic slab which is transverse to the direction of RF magnetization in the $TE_{110}$ mode in said resonant cavity, such that an RF magnetization component substantially parallel to the direction of static magnetization and oscillating at a frequency double that of the input energy is provided within said resonant cavity; and a pair of tuning screws, one mounted in the top wall of said resonant cavity and one mounted in a side wall of said cavity, each of said tuning screws being movably insertable through the associated cavity wall to penetrate into the interior of said cavity, for individually tuning the cavity to the $TE_{021}$ and $TE_{110}$ modes respectively.

References Cited in the file of this patent

UNITED STATES PATENTS

| | | |
|---|---|---|
| 2,671,884 | Zaleski | Mar. 9, 1954 |
| 2,817,760 | Dobbertin | Dec. 24, 1957 |

OTHER REFERENCES

Ayres, Vartanian, and Melchor, "Frequency Doubling in Ferrites," J. Appl. Phys., volume 27, pp. 188–189, February 1956.

Melchor, Ayres, and Vartanian, "Microwave Frequency Doubling from 9 to 18 KMC in Ferrites," Proc. I.R.E., volume 45, No. 5, pages 643–646, May 1957.